(12) United States Patent
Ako (10) Patent No.: US 12,535,677 B2
(45) Date of Patent: Jan. 27, 2026

(54) EYE TRACKING DEVICE AND METHODS OF OPERATION

(71) Applicant: Tobii Dynavox AB, Stockholm (SE)

(72) Inventor: Shea Kananionalani Ako, Chicago, IL (US)

(73) Assignee: Tobii Dynavox AB, Stockholm (SE)

( * ) Notice: Subject to any disclaimer, the term of this patent is extended or adjusted under 35 U.S.C. 154(b) by 0 days.

(21) Appl. No.: 18/708,311

(22) PCT Filed: Nov. 15, 2022

(86) PCT No.: PCT/IB2022/060990
§ 371 (c)(1),
(2) Date: May 8, 2024

(87) PCT Pub. No.: WO2023/084496
PCT Pub. Date: May 19, 2023

(65) Prior Publication Data
US 2024/0418989 A1    Dec. 19, 2024

Related U.S. Application Data (60) Provisional application No. 63/279,204, filed on Nov. 15, 2021.

(51) Int. Cl.
*G02B 27/00* (2006.01)
*G06F 1/16* (2006.01)
*G06F 1/3212* (2019.01)

(52) U.S. Cl.
CPC ....... *G02B 27/0093* (2013.01); *G06F 1/1632* (2013.01); *G06F 1/3212* (2013.01)

(58) Field of Classification Search
CPC ...... H02J 7/0044; G06F 3/013; G06F 1/3212; G06F 1/1632; G02B 27/0093
See application file for complete search history.

(56) References Cited

U.S. PATENT DOCUMENTS

| | | | |
|---|---|---|---|
| 9,693,684 B2 * | 7/2017 | Lopez | G06F 21/31 |
| 10,644,524 B2 * | 5/2020 | Shiba | H02J 7/0045 |
| 2014/0145935 A1 * | 5/2014 | Sztuk | G06V 40/19 |
| | | | 345/156 |
| 2014/0226131 A1 * | 8/2014 | Lopez | G06F 21/31 |
| | | | 351/210 |
| 2016/0161988 A1 * | 6/2016 | Reymond | A45C 11/00 |
| | | | 455/575.8 |
| 2019/0102423 A1 | 4/2019 | Little et al. | |
| 2019/0340619 A1 | 11/2019 | Leong et al. | |

FOREIGN PATENT DOCUMENTS

| KR | 1020200089204 A | 7/2020 |
|---|---|---|
| WO | 2019170174 A2 | 9/2019 |

OTHER PUBLICATIONS

Sarsby, "World's first eye tracker technology for iPad Pro turns the tablet into a flexible AAC device", 2020, DOI: https://attoday.co.uk/worlds-first-eye-tracker-technology-for-ipad-pro-turns-the-tablet-into-a-flexible-aac-device/.

* cited by examiner

*Primary Examiner* — Mihir K Rayan (74) *Attorney, Agent, or Firm* — The Webb Law Firm (57) ABSTRACT

The present disclosure is related to a peripheral containing an eye tracking device, a controller, and a battery. The peripheral may be able to receive a user device. When the user device is connected to the peripheral, the eye tracking device may transmit eye tracking data to the user device, and the controller may dynamically charge the user device, as well as power the eye tracking device.

18 Claims, 6 Drawing Sheets

EYE TRACKING DEVICE AND METHODS OF OPERATION

CROSS-REFERENCE TO RELATED APPLICATIONS

This application is the United States national phase of International Application No. PCT/IB2022/060990 filed Nov. 15, 2022, and claims priority to U.S. Provisional Patent Application No. 63/279,204 filed Nov. 15, 2021, the disclosures of which are hereby incorporated by reference in their entireties.

BACKGROUND

Field of the Invention

This disclosure relates generally to eye tracking devices, and in some non-limiting embodiments, systems and methods for operating eye tracking devices.

Discussion of the Related Art

The majority of computing devices (e.g., desk tops, laptops, tablets, smart phones, smart watches, and/or the like) are controlled by a user through methods of input such as a keyboard, mouse, trackpad, graphic tablet, touchscreen, or stylus, for example. Each of these input methods require physical interaction of some kind by the user. However, some users and/or situations require a different method of interaction, such as eye tracking.

Eye tracking devices may include electronic devices configured to receive, capture, and/or process data (e.g., gaze data). Eye tracking devices may include cameras, image sensors, and/or light. Eye tracking devices may be part of (e.g., integrated into) computing devices and/or provided as a peripheral and/or an accessory to such computing devices.

In some situations, it may be desirable to provide a standalone computing device with which a user can interact. Such standalone computing devices may include a single housing within which is housed a display, an eye tracking device, and the controller and processing circuitry that operate the computing device. For example, the I-Series devices, developed by Tobii Dynavox AB of Sweden, are integrated computing devices that provide eye tracking as a method through which the user can interact.

In other situations, eye tracking as a method of control or interaction may be provided by a peripheral that can be attached, either through a wired or wireless interface, to an external computing device. These devices provide some eye tracking functionality to a device that would otherwise have no eye tracking functionality. For example, the Eye Tracker 5, developed by Tobii AB of Sweden, is an external peripheral that can interface with an external computing device in order to provide eye tracking functionality to a user.

SUMMARY

According to non-limiting embodiments, provided is an eye tracking system. In some non-limiting embodiments, the eye tracking system may include a housing configured to receive a user device in a position to present a display of the user device to a user; an eye tracking device configured to track a gaze of the user by capturing gaze data from the user; and at least one controller configured to: receive the gaze data from the eye tracking device; generate a user calibration profile of the user by mapping the gaze data to data associated with an image displayed via a display of the user device; and store the user calibration profile in a memory of the eye tracking system. In some non-limiting embodiments, the housing may include an adjustable portion of a first size, and wherein the adjustable portion of the housing is configured to adjust from the first size to a second size to receive the user device. In some non-limiting embodiments, the adjustable portion may include a retractable member, and the retractable member may be configured to move in a vertical direction to secure the user device. In some non-limiting embodiments, the eye tracking device may include at least one image sensor and at least one illuminator. In some non-limiting embodiments, the eye tracking system may further include a protective case configured to at least partially surround the user device.

According to non-limiting embodiments, provided is an eye tracking system for use with a user device, the eye tracking system comprising: a housing configured to receive the user device in a position to present a display of the user device to a user; an eye tracking device configured to track a gaze of the user; and a controller configured to: monitor a first charge status of a battery of the eye tracking device; monitor a second charge status of a battery of the user device; and select a charging scheme based on the first charge status, the second charge status, and the presence of an external power source. In some non-limiting embodiments, the housing may include an adjustable portion of a first size, and the adjustable portion of the housing may be configured to adjust from the first size to a second size to receive the user device. In some non-limiting embodiments, the adjustable portion may include a retractable member, and the retractable member may be configured to move in a vertical direction to secure the user device. In some non-limiting embodiments, the eye tracking device may include at least one image sensor and at least one illuminator. In some non-limiting embodiments, the eye tracking system may further include a protective case configured to at least partially surround the user device.

According to non-limiting embodiments, provided is a method, the method including connecting a user device to an eye tracking system; receiving gaze data from a user of the user device; generating a calibration profile for the user based on the gaze data, wherein the calibration profile enables the gaze data to be mapped to a display of the user device; and storing the calibration profile in a memory of the eye tracking system. In some non-limiting embodiments, the user device may include a housing, wherein the housing comprises an adjustable portion, and wherein the housing of the user device is configured to receive the user device in a position to present the display of the user device to a user. In some non-limiting embodiments, the method may further include adjusting the adjustable portion of the housing from a first size to a second size, wherein the second size is based on a size of the user device. In some non-limiting embodiments, the adjustable portion may include a retractable member, and the retractable member may move in a vertical direction to secure the user device. In some non-limiting embodiments, the eye tracking device may include at least one image sensor and at least one illuminator. In some non-limiting embodiments, the user device may include a protective case, and the protective case may be configured to at least partially surround the user device. According to non-limiting embodiments, provided is a method, the method including receiving, by a housing, a user device in a position to present a display of the user device to a user; tracking, by an eye tracking device, a gaze of the user; and monitoring, by a controller, a first charge status of a battery of the eye tracking device; monitoring, by the controller, a second charge status of a battery of the user device; and selecting, by the controller, a charging scheme based on the first charge status, the second charge status, and the presence of an external power source. In some non-limiting embodiments, receiving the user device may include adjusting, by a user, an adjustable portion of the housing configured to receive different sizes of the user device, wherein the adjustable portion includes a retractable member that moves vertically to secure a received user device. In some non-limiting embodiments, the eye tracking device may include at least one image sensor and at least one illuminator.

Other non-limiting embodiments or aspects will be set forth in the following numbered clauses:

Clause 1: An eye tracking system comprising: a housing configured to receive a user device in a position to present a display of the user device to a user; an eye tracking device configured to track a gaze of the user by capturing gaze data from the user; and at least one controller configured to: receive the gaze data from the eye tracking device; generate a user calibration profile of the user by mapping the gaze data to data associated with an image displayed via a display of the user device; and store the user calibration profile in a memory of the eye tracking system.

Clause 2: The eye tracking system of clause 1, wherein the housing comprises an adjustable portion of a first size, and wherein the adjustable portion of the housing is configured to adjust from the first size to a second size to receive the user device.

Clause 3: The eye tracking system of clause 1 or clause 2, wherein the adjustable portion comprises a retractable member, and wherein the retractable member is configured to move in a vertical direction to secure the user device.

Clause 4: The eye tracking system of any of clauses 1-3, wherein the eye tracking device comprises at least one image sensor and at least one illuminator.

Clause 5: The eye tracking system of any of clauses 1-4, further comprising a protective case configured to at least partially surround the user device.

Clause 6: An eye tracking system for use with a user device, the eye tracking system comprising: a housing configured to receive the user device in a position to present a display of the user device to a user; an eye tracking device configured to track a gaze of the user; and a controller configured to: monitor a first charge status of a battery of the eye tracking device; monitor a second charge status of a battery of the user device; and select a charging scheme based on the first charge status, the second charge status, and the presence of an external power source.

Clause 7: The eye tracking system of clause 6, wherein the housing comprises an adjustable portion of a first size, and wherein the adjustable portion of the housing is configured to adjust from the first size to a second size to receive the user device.

Clause 8: The eye tracking system of any of clause 6 or clause 7, wherein the adjustable portion includes a retractable member, and wherein the retractable member is configured to move in a vertical direction to secure the user device.

Clause 9: The eye tracking system of any of clauses 6-8, wherein the eye tracking device comprises at least one image sensor and at least one illuminator.

Clause 10: The eye tracking system of any of clauses 6-9, further comprising a protective case configured to at least partially surround the user device.

Clause 11: A method comprising: connecting a user device to an eye tracking system; receiving gaze data from a user of the user device; generating a calibration profile for the user based on the gaze data, wherein the calibration profile enables the gaze data to be mapped to a display of the user device; and storing the calibration profile in a memory of the eye tracking system.

Clause 12: The method of clause 11, wherein the user device comprises a housing, wherein the housing comprises an adjustable portion, and wherein the housing of the user device is configured to receive the user device in a position to present the display of the user device to a user, and wherein the method further comprises: adjusting the adjustable portion of the housing from a first size to a second size, wherein the second size is based on a size of the user device.

Clause 13: The method of clause 11 or clause 12, wherein the adjustable portion includes a retractable member, and wherein the retractable member moves in a vertical direction to secure the user device.

Clause 14: The method of any of clauses 11-13, wherein the eye tracking device comprises at least one image sensor and at least one illuminator.

Clause 15: The method of any of clauses 11-14, wherein the user device comprises a protective case, and wherein the protective case is configured to at least partially surround the user device.

Clause 16: A method comprising: receiving, by a housing, a user device in a position to present a display of the user device to a user; tracking, by an eye tracking device, a gaze of the user; and monitoring, by a controller, a first charge status of a battery of the eye tracking device; monitoring, by the controller, a second charge status of a battery of the user device; and selecting, by the controller, a charging scheme based on the first charge status, the second charge status, and the presence of an external power source.

Clause 17: The method of clause 16, wherein receiving the user device further comprises: adjusting, by a user, an adjustable portion of the housing configured to receive different sizes of the user device, wherein the adjustable portion includes a retractable member that moves vertically to secure a received user device.

Clause 18: The method of clause 16 or clause 17, wherein the eye tracking device comprises at least one image sensor and at least one illuminator.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION OF THE PREFERRED EMBODIMENTS

For purposes of the description hereinafter, the terms "end," "upper." "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the present disclosure. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having." or the like are intended to be open-ended terms. Further, the phrase "based on" is intended to mean "based at least partially on" unless explicitly stated otherwise.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "user device" may refer to one or more electronic devices configured to process data. A user device may, in some examples, include the necessary components to receive, process, and output data, such as a processor, a display, a memory, an input device, a network interface, and/or the like. A user device may be a mobile device. As an example, a mobile device may include a cellular phone (e.g., a smartphone or standard cellular phone), a portable computer (e.g., a laptop computer, a tablet computer, and/or the like), a wearable device (e.g., watches, glasses, lenses, clothing, and/or the like), a personal digital assistant (PDA), and/or other like devices. A user device may also be a desktop computer or other form of non-mobile computer.

As used herein, the terms "eye tracking device" may refer to one or more electronic devices configured to receive, capture, and/or process data (e.g., gaze data). An eye tracking device may, in some examples, may include a camera, image sensor(s) (e.g., complementary metal oxide semiconductor (CMOS) sensors, charged coupled device (CCD) sensors, and/or the like), and/or lights. An eye tracking device, in some examples, may be part of (e.g., integrated into) a user device. Alternatively, an eye tracking device may be an accessory for a user device.

Provided are methods and systems for an eye tracking system. In some non-limiting embodiments, the eye tracking system may include a housing configured to receive a user device in a position to present a display of the user device to a user; an eye tracking device configured to track a gaze of the user by capturing gaze data from the user; and at least one controller configured to: receive the gaze data from the eye tracking device; generate a user calibration profile of the user by mapping the gaze data to data associated with an image displayed via a display of the user device; and store the user calibration profile in a memory of the eye tracking system. In some non-limiting embodiments, the housing may include an adjustable portion of a first size, and wherein the adjustable portion of the housing is configured to adjust from the first size to a second size to receive the user device. In some non-limiting embodiments, the adjustable portion may include a retractable member, and the retractable member may be configured to move in a vertical direction to secure the user device. In some non-limiting embodiments, the eye tracking device may include at least one image sensor and at least one illuminator. In some non-limiting embodiments, the eye tracking system may further include a protective case configured to at least partially surround the user device.

In some non-limiting embodiments, the eye tracking system may include: a housing configured to receive the user device in a position to present a display of the user device to a user; an eye tracking device configured to track a gaze of the user; and a controller configured to: monitor a first charge status of a battery of the eye tracking device; monitor a second charge status of a battery of the user device; and select a charging scheme based on the first charge status, the second charge status, and the presence of an external power source.

In some non-limiting embodiments, a user device may be connected (e.g., via a wired or wireless connection) to the eye tracking system. In some non-limiting embodiments, the user device may include a housing, wherein the housing comprises an adjustable portion, and wherein the housing of the user device is configured to receive the user device in a position to present the display of the user device to a user. In some non-limiting embodiments method may further include adjusting the adjustable portion of the housing from a first size to a second size, wherein the second size is based on a size of the user device. In some non-limiting embodiments, the adjustable portion may include a retractable member, and the retractable member may move in a vertical direction to secure the user device. In some non-limiting embodiments, the eye tracking device may include at least one image sensor and at least one illuminator. In some non-limiting embodiments, the user device may include a protective case, and the protective case may be configured to at least partially surround the user device.

According to non-limiting embodiments, provided is a method, the method including receiving, by a housing, a user device in a position to present a display of the user device to a user; tracking, by an eye tracking device, a gaze of the user; and monitoring, by a controller, a first charge status of a battery of the eye tracking device; monitoring, by the controller, a second charge status of a battery of the user device; and selecting, by the controller, a charging scheme based on the first charge status, the second charge status, and the presence of an external power source. In some non-limiting embodiments, receiving the user device may include adjusting, by a user, an adjustable portion of the housing configured to receive different sizes of the user device, wherein the adjustable portion includes a retractable member that moves vertically to secure a received user device. In some non-limiting embodiments, the eye tracking device may include at least one image sensor and at least one illuminator.

The systems and methods provided herein may provide eye tracking functionality to user devices, thereby enabling users to communicate with the user devices using eye gaze data as an input.

Figure 1A:
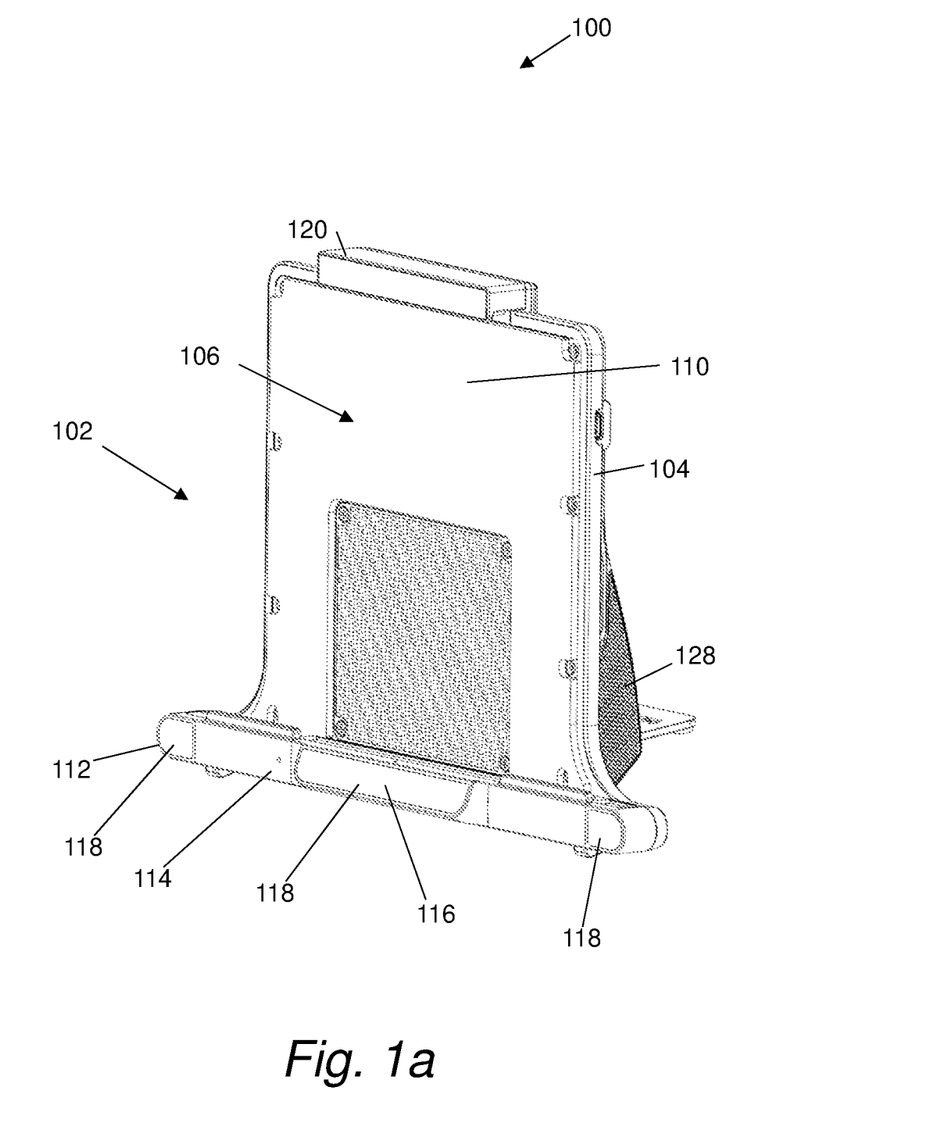
FIG. 1a is a front perspective view of an embodiment of an eye tracking peripheral in accordance with the present disclosure.

FIG. 1a is a front perspective view of an embodiment of an eye tracking peripheral in accordance with the present disclosure.

Figure 1B:
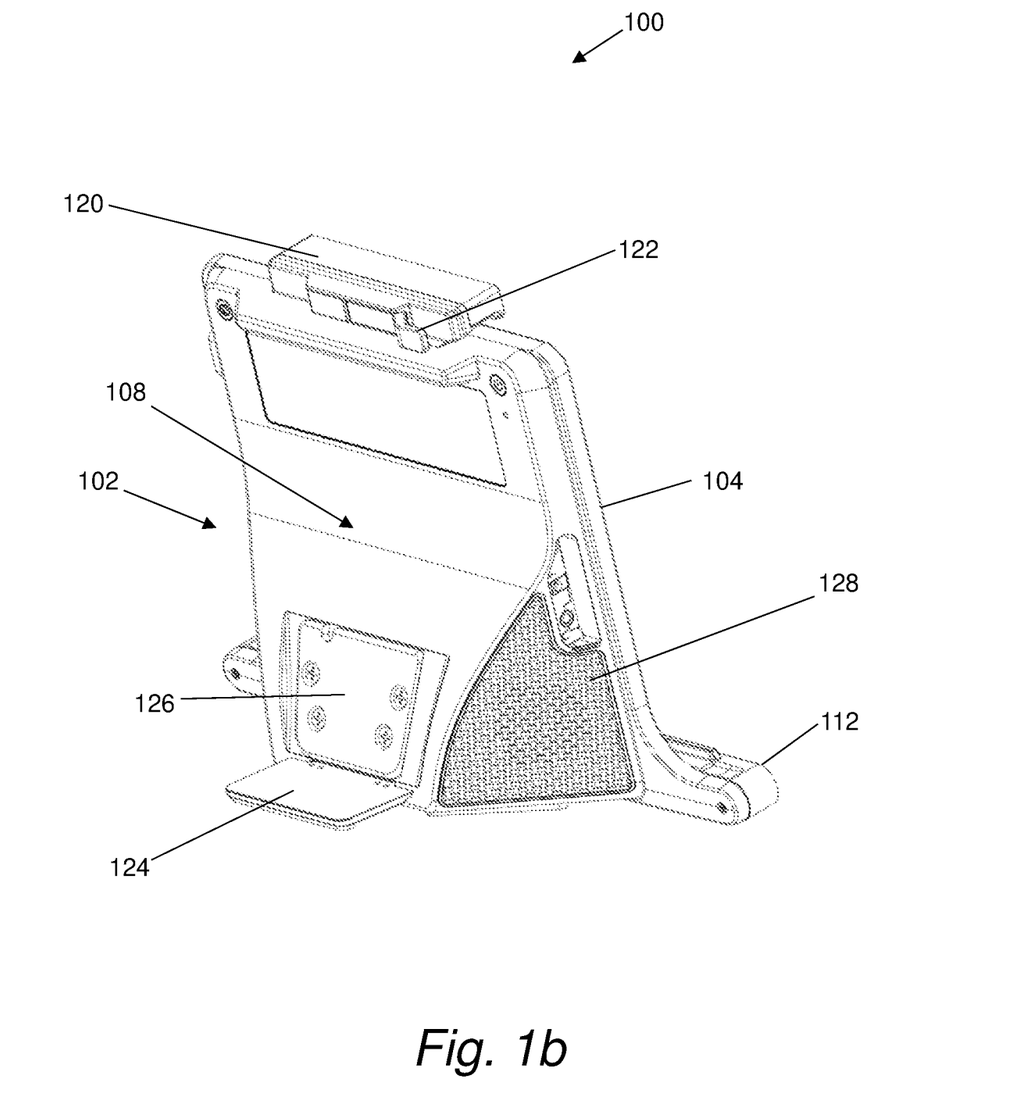
FIG. 1*b* is a rear perspective view of the eye tracking peripheral of FIG. 1*a*.

Referring to FIGS. 1a and 1b, shown is a non-limiting embodiment of an eye tracking peripheral 100 (hereinafter "peripheral"). In some non-limiting embodiments, peripheral 100 may include base 102. In some non-limiting embodiments, peripheral 100 and/or base 102 may include housing 104. For example, housing 104 may be the same as and/or part of base 102. In some non-limiting embodiments, housing 104 may include a front part 106 and/or a rear part 108. For example, front part 106 may be configured to receive a user device thereon and/or rear part 108 may enclose various components of peripheral 100. In some non-limiting embodiments, rear part 108 may form a stand. For example, the stand formed by rear part 108 may allow peripheral 100 to stand up (e.g., in a vertical direction) unsupported (e.g., by a user holding the device). In some non-limiting embodiments, rear part 108 may include stabilizer member 124. For example, stabilizer member 124 may be part of the stand and/or may be configured to stabilize peripheral 100 in the vertical direction. In some non-limiting embodiments, peripheral 100 may include mounting point 126. In some non-limiting embodiments, mounting point 126 may be configured to interface with an external articulating member (not shown), or other mounting system. For example, mounting point 126 may connect to a mounting system via a fastener, such as a screw or another connector known to those of skill in the art. In some non-limiting embodiments, front part 106 of peripheral 100 may be removably connected to rear part 108 of peripheral 100.

In some non-limiting embodiments, front part 106 may include a substantially planar front face 110. In some non-limiting embodiments, substantially planar front face 110 may allow a user device (not shown in FIGS. 1a and 1b) to be seated thereon in a substantially planar arrangement on front face 110. In some non-limiting embodiments, first elongated member 112 may protrude forward from the lower edge of the front face 110. For example, an edge of the user device (not shown) may be placed upon first elongated member 112, such that first elongated member 112 may provide support to the user device. In some non-limiting embodiments, first elongated member 112 may house eye tracking device 114. In some non-limiting embodiments, eye tracking device 114 may be configured to capture gaze data and/or images of the eyes of a user. The gaze data and/or images captured by eye tracking device 114 may then be processed (e.g., by at least one processor of eye tracking device 114, peripheral 100, and/or the user device) in order to estimate a gaze position (e.g., a location where a user is looking) on an object, such as a display of the received user device, and/or a gaze direction (e.g., a direction in which the user is looking).

In some non-limiting embodiments, eye tracking device 114 may include image sensor 116. For example, image sensor 116 may be part of eye tracking device 114 and may be positioned (e.g., centrally) within first elongated member 112. In some non-limiting embodiments, image sensor 116 may include at least one illuminator 118. For example, image sensor 116 may include three equally spaced apart illuminators 118. In some non-limiting embodiments, image sensor 116 may be an image sensor of any type, such as a complementary metal oxide semiconductor (CMOS) image sensor or a charged coupled device (CCD) image sensor. In some non-limiting embodiments, image sensor 116 may be positioned at an angle within first elongated member 112. For example, image sensor 116 may be angled slightly upwards to provide an enhanced view of eyes of a user using peripheral 100 in combination with a user device received by peripheral 100. In some non-limiting embodiments, the at least one illuminator 118 may emit infrared (IR) light. In some non-limiting embodiments, image sensor 116 may be configured to detect IR light emitted by illuminators 118 and reflected by the user (e.g., reflected by the eyes of the user) to track a position of the eyes relative to the image sensor 116. In some non-limiting embodiments, an illuminator 118 may be positioned at each opposing end opposing of first elongated member 112 and may be illuminated to allow the image sensor 116 to capture dark pupil (DP) images of the eyes of the user. In some non-limiting embodiments, a single illuminator 118 may be positioned adjacent to the image sensor 116 and may be illuminated to allow the image sensor 116 to capture bright pupil (BP) images of the eyes of the user. Additionally or alternatively, the eye tracking device 114 may include other combinations of one or more image sensors 116 and/or one or more illuminators 118, which may combine to allow images of the eyes of the user to be captured. Alternative arrangements suitable for providing eye tracking functionality will be known to the skilled person and therefore need not be discussed any further.

In some non-limiting embodiments, a second elongated member 120 may be positioned at an upper edge of the front face 110. In some non-limiting embodiments, a position of the second elongated member 120 may be adjustable. For example, the second elongated member 120 may be adjusted from a first position to a second position, in a direction perpendicular to the first elongated member 112 in the plane of the front face 110, allowing second elongated member 120 to be moved (e.g., up and/or down) to receive a user device. By adjusting the position of the second elongated member 120, different sizes of user device may be seated on, and received by, the peripheral 100. In some non-limiting embodiments, the second elongated member 120 may be adjusted by a user to a desired position and then secured in place via a securing means such as clamps, clips, and/or the like. For example, after being adjusted from the first position to the second position by a user, second elongated member 120 may be secured in place by clamp 122.

In some non-limiting embodiments, rear part 108 of the peripheral 100 may extend backwards from front part 106. In some non-limiting embodiments rear part 108 of peripheral 100 may have a substantially triangular profile which may provide peripheral 100 with a first level of stability when placed on a surface. In some non-limiting embodiments, stabilizer member 124 may be connected to rear part 108 via a hinge and may be extended and/or released from rear part 108 in order to provide a second level of stability to the peripheral 100. In some non-limiting embodiments, the second level of stability may be greater (e.g., more stable) than the first level of stability. When not required, such as when the peripheral 100 is connected to a mount (e.g., a wheelchair), stabilizer member 124 may be retracted. In some non-limiting embodiments, mounting point may include a plurality of connection points (e.g., screw holes) to be connected (e.g., screwed) to a mount. In some non-limiting embodiments, mounting point 126 may be provided on the rear of rear part 108, which allows connection to a mount via a plurality of screw holes.

Figure 3:
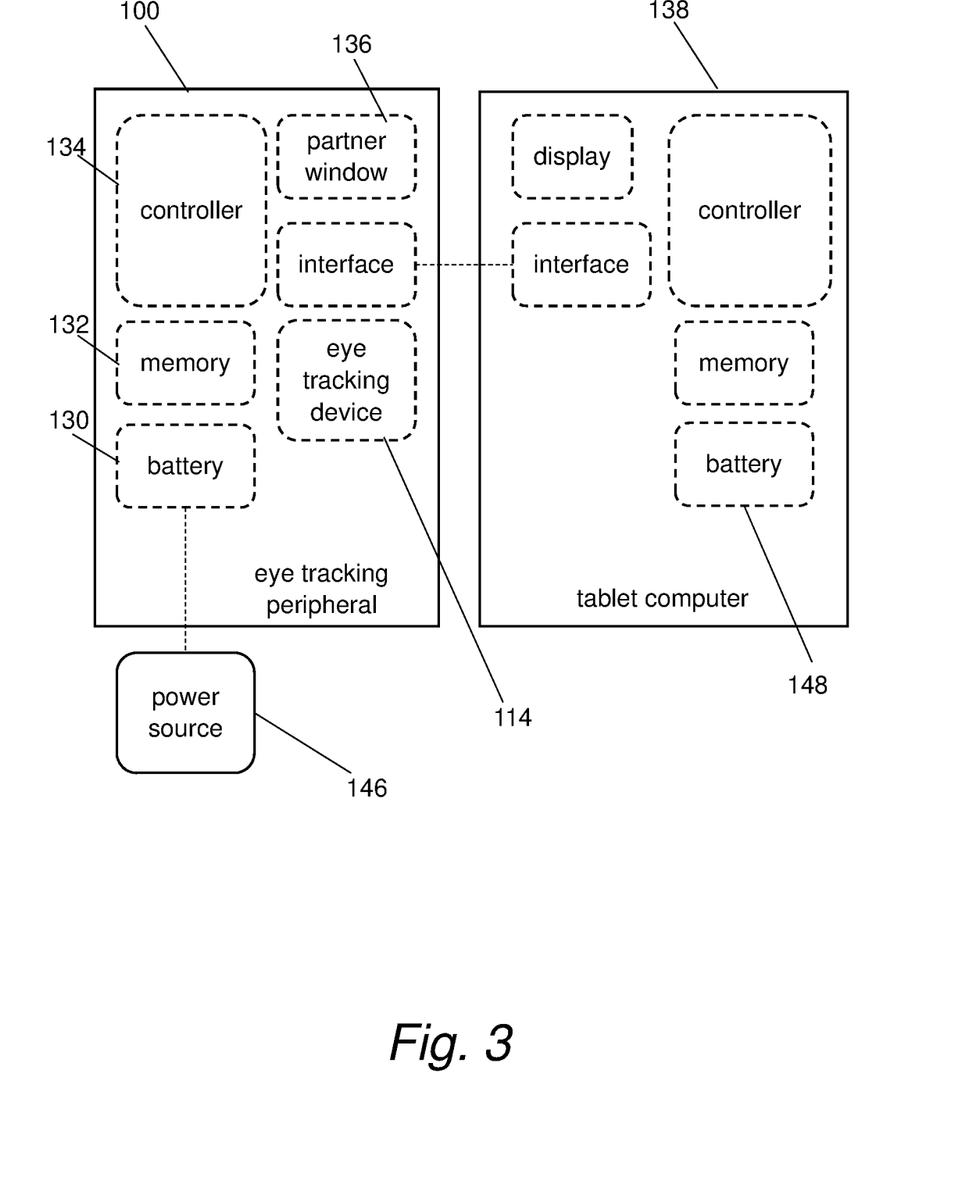
FIG. 3 is a schematic view of the eye tracking peripheral and user device of FIG. 2*a*.

In some non-limiting embodiments, rear part 108 may house a plurality of speakers. For example, rear part 108 may house two speakers 128 positioned on either side of housing 104. In some non-limiting embodiments, peripheral 100 may emit sound via the plurality of speakers 128. For example, the peripheral 100 may emit sound towards the user and/or a person being addressed by the user. In some non-limiting embodiments, the speakers 128 may preferably output sound that is directed to be output by software (e.g. an augmentative and alternative communication (AAC) application) executed on a connected user device. Additionally or alternatively, the plurality of speakers 128 may output sound that is directed to be output by peripheral 100. In some non-limiting embodiments, rear part 108 may house battery 130, memory 132, and/or controller 134, as shown in FIG. 3. In some non-limiting embodiments, rear part 108 may include partner window 136. For example, partner window 136 may include an outward facing display positioned toward the top of rear part 108. Partner window 136 may display data associated with characters, messages, images, and/or other information to a person being addressed by the user (e.g., a person facing rear part 108). Examples of other information will be discussed later in the present disclosure.

Figure 2A:
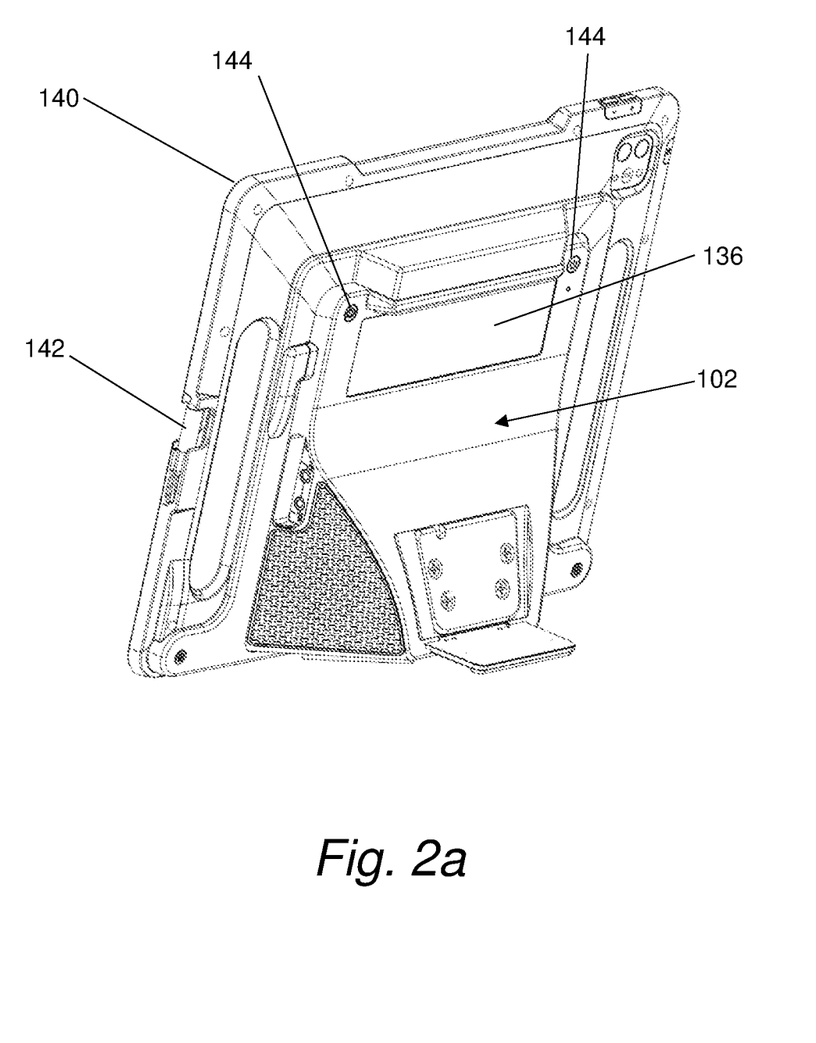
FIG. 2*a* is a rear perspective view of the eye tracking peripheral of FIG. 1*a*, with protective case enclosing a user device mounted on the eye tracking peripheral.
Figure 2B:
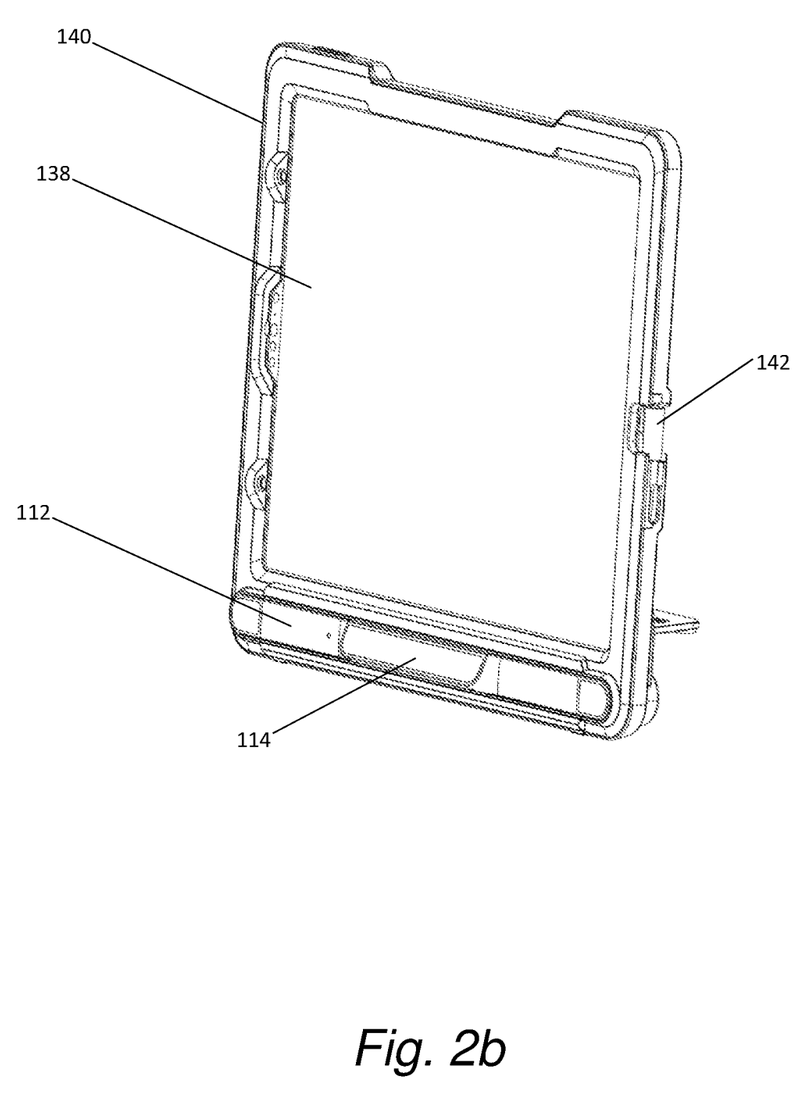
FIG. 2*b* is a front perspective view of the assembly of FIG. 2*a*.

As shown in FIGS. 2a and 2b, user device 138 may be mounted on base 102. In some non-limiting embodiments, protective case 140 may surround user device 138. For example, protective case 140 may surround the edges of user device 138 and/or partially surround base 102, enclosing user device 138 when mounted. In some non-limiting embodiments, protective case 140 may be designed such that at least image sensor 116 and illuminators 118 of the enclosed eye tracking device 114 remain uncovered by protective case 140, such that eye tracking device 114 is fully operable when user device 138 is mounted to base 102 and protective case 140 is installed. Additionally or alternatively, the protective case 140 may cover eye tracking device 114. For example, protective case 140 may be formed at least partially of an IR-transparent material, which allows eye tracking device 114 to maintain functionality when covered by protective case 140. In some non-limiting embodiments, protective case 140 may be water resistant, water proof, splash proof, provide drop protection, provide scratch protection, and/or any combination of these types of protections and/or any other types of protection.

In some non-limiting embodiments, when user device 138 is placed on the front part 106 of the peripheral 100, it may be operably connected to peripheral 100 via a connection means. For example, user device 138 may be connected to peripheral 100 via cable 142. In some non-limiting embodiments, cable 142 may extend from a first port on the base to a second port on the user device 138. In some non-limiting embodiments, cable 142 may transmit power and/or data between peripheral 100 and user device 138. In some non-limiting embodiments, power and data may be transmitted over separate connections (e.g., separate cables). In some non-limiting embodiments, once protective case 140 is attached to base 102, cable 142 may be protected from inadvertent removal. In some non-limiting embodiments, the connection means may be any form of known data and/or power transmitting connection, including USB-C, micro-USB, and/or the like. In some non-limiting embodiments, connection may be provided by a cable, as shown, or by, for example, a docking station type arrangement. Other options for providing power and data connections will be readily implemented by the skilled person, if desired.

In some non-limiting embodiments, when peripheral 100 is operably connected to user device 138, controller 134 of peripheral 100 may transmit eye tracking information to user device 138. For example, controller 134 of peripheral 100 may transmit eye tracking information (e.g., eye image data and/or gaze data) captured by eye tracking device 114 to user device 138. In some non-limiting embodiments, upon receiving the eye tracking information from controller 134, user device 138 may transmit other information (e.g., data) to peripheral 100. For example, user device 138 may transmit audio data to be output by the speakers 128, and/or data associated with a message and/or an image to be displayed via partner window 136. In some non-limiting embodiments, the eye tracking information may be used by user device 138 to control software (e.g., an AAC application) running on user device 138. In some non-limiting embodiments, eye tracking information may be two-dimensional gaze information, such as x and y coordinates of a user's gaze position on a display of user device 138, and/or other gaze related information. For example, the gaze data input into user device 138 may include x and y coordinates of the user's gaze position. In some non-limiting embodiments, the user's gaze position may be determined by controller 134 of peripheral 100 based on the data received from eye tracking device 114. In some non-limiting embodiments, peripheral 100 may translate raw gaze data to output gaze data. For example, raw gaze data, i.e., the images taken by image sensor 116 of the user's eye(s), may be translated to output gaze data, i.e., data that can then be used directly to control applications running on user device 138, by peripheral 100. Dependent upon the software or application running on user device 138, different gaze information, including, but not limited to, estimated reliability of the gaze data, characteristics of the user, and/or calibration data regarding the user may be provided to user device 138. However, in some non-limiting embodiments, the output data may be limited to data required for control of the software or application running on user device 138 and other data such as the said calibration data, reliability data, error logs, etc., may remain on peripheral 100.

In some non-limiting embodiments, partner window 136, which may include an outward facing display, may display data associated with text, images, animations, and/or the like. The display may be in the form of any known display technology, such as a Liquid Crystal Display (LCD), Light Emitting Diode (LED), or Organic Light Emitting Diode (OLED) display. For example, partner window 136 may display information regarding user device 138 and/or peripheral 100, such as information provided by software on user device 138, or diagnostic information such as error information, or battery capacity information. In some non-limiting embodiments, partner window 136 may display information about the peripheral 100 even when peripheral 100 is not connected to user device 138.

In some non-limiting embodiments, battery 130 of peripheral 100, which may be housed within rear part 108, may be configured to store energy with which to power eye tracking device 114, partner window 136, speakers 128 (or amplifier connected thereto), and/or user device 138 (when the user device 138 is operably connected to the peripheral 100).

In some non-limiting embodiments, peripheral 100 may include one or more buttons 144 configured to execute functionality on user device 138 or peripheral 100. In some non-limiting embodiments buttons 144 may be physically interactive buttons. In some non-limiting embodiments, buttons 144 may be operated by physical contact of the user on peripheral 100, and/or by using gaze input. For example, buttons 144 may be physical buttons which may require depression by a user or solid-state buttons, such as capacitive buttons. In some non-limiting embodiments, buttons 144 may be configured to execute and/or launch software or applications on user device 138. For example, the user may select a button 144 to calibrate eye tracking device 114 to improve the accuracy of eye tracking information obtained by eye tracking device 114. Such a calibration procedure would be well understood by a person of skill in the art. In some non-limiting embodiments, a button 144 may be configured to display information on partner window 136, such as battery capacity or estimated run time information.

As shown in FIG. 2a, rear part 108 of peripheral 100 and/or base 102 may include two buttons 144. In some non-limiting embodiments, a first button 144, may be configured to turn the peripheral 100 on and/or off, and/or display on the partner window 136 the status of the level of charge stored in the battery 130. A second button 144 may be configured to provide additional functionality, which may commonly be the initiation of the aforementioned calibration procedure, when a user device 138 is connected to the peripheral 100. In some non-limiting embodiments, the first button 144 and the second button 144 may be on the same side (e.g., the left side or right side) or rear part 108 or on opposite sides of rear part 108. In some non-limiting embodiments, when user device 138 is not connected, second button 144 may provide a first functionality, where the first functionality may be different than a second functionality provided when user device 138 is connected and/or no functionality. In some non-limiting embodiments, peripheral 100 may include a single button 144 which provides all the aforementioned functionality.

As shown in FIG. 3, peripheral 100 may include memory 132 and/or controller 134. In some non-limiting embodiments, controller 134 may be configured to manage output from battery 130 to the components of peripheral 100 requiring power as well as user device 138 itself. For example, controller 134 may monitor the energy level of a battery contained in user device 138, and if that energy level reaches a predetermined threshold, battery 130 in peripheral 100 may be controlled to direct energy to the user device 138 to charge the battery 130 located in user device 138. In some non-limiting embodiments, the predetermined threshold may be 50% of the energy level of battery 130. In some non-limiting embodiments, peripheral 100 may be connectable to an external power source 146, from which battery 130 of peripheral 100 may be charged. When connected, peripheral 100 may solely charge battery 130 within peripheral 100 and/or peripheral 100 may provide power to a connected user device 138 to charge both peripheral 100 and user device 138.

In some non-limiting embodiments, data may be stored in the memory 132 of peripheral 100. For example, memory 132 may store data including, but not limited to: calibration data regarding the physiological properties of the eye or eyes of a user; user preferences, such as a preference regarding gaze filtering affecting responsiveness, accuracy, or precision of gaze data; user device information (such as display size, model number, etc.); diagnostic data; a user's name, location, or other user information; and/or application specific preferences, such as data which may be accessed by an application installed on the user device to modify the behavior of the application.

In some non-limiting embodiments, data stored in memory 132 may be accessed (e.g., by one or more processor of peripheral 100, eye tracking device 114, and/or user device 138) to allow peripheral 100 to be used by a plurality of user devices 138. For example, storing data in the memory 132 may enable peripheral 100 to be disconnected from and reconnected to user device 138, or disconnected from a first user device 138 and reconnected to a second user device 138, without requiring the user to perform another calibration and/or without any loss of interaction preferences with the first user device 138.

Figure 4:
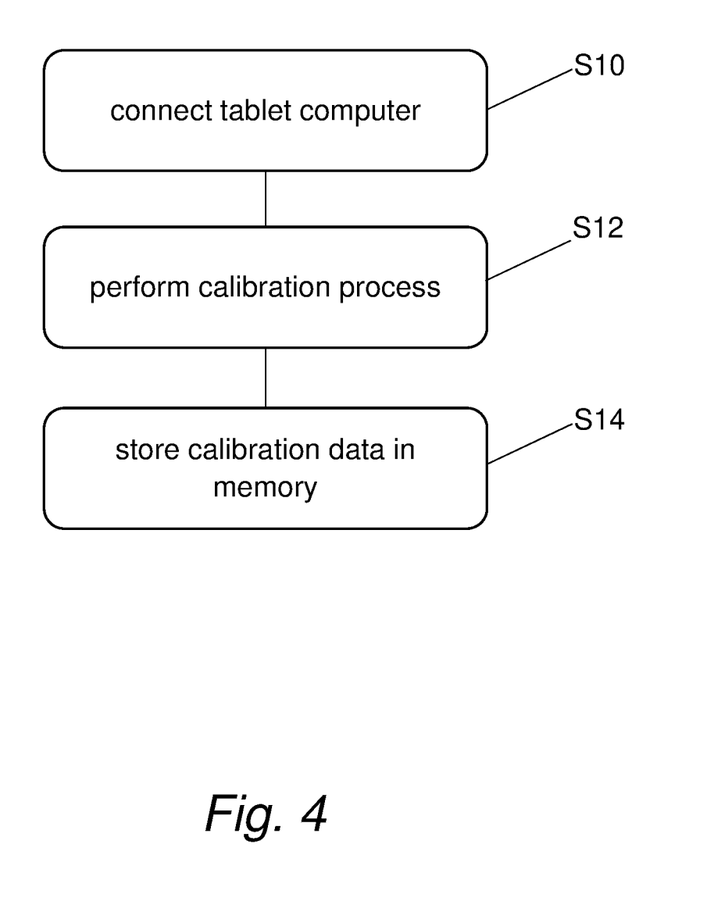
FIG. 4 is a flow chart depicting a method of operating the eye tracking peripheral.

As shown in FIG. 4, a method for operating peripheral 100 may include steps S10-S14. At step S10, the method for operating peripheral 100 includes connecting a user device 138 (e.g., a tablet computer) to peripheral 100. For example, a user may connect the user device 138 to peripheral 100 using a connection means such as cable 142. Next, at step S12, the method for operating peripheral 100 includes performing S12 a calibration process. The calibration process may be performed by any well-known method, of which the skilled person will be aware. In some non-limiting embodiments, the calibration process may be initiated by the user. For example, the user may press button 144 to begin the calibration process. In some non-limiting embodiments, calibration data may be output at the end of the calibration process. Next, at step S14 the method for operating peripheral 100 includes storing the calibration data in a memory. For example, the calibration data may be stored within memory 132 of peripheral 100. In some non-limiting embodiments, calibration data may include physiological data that allows an eye model of eye tracking device 114 to be used to determine, through well-known eye tracking techniques, a direction of gaze of the user. As the calibration data is stored in memory 132 of peripheral 100, peripheral 100 may be used by the same user with one or more different user devices 138, which may be disconnected and reconnected at will, without requiring additional calibration processes to be performed.

In some non-limiting embodiments, controller 134 may analyze data from user device 138 regarding the battery capacity and/or usage of a battery of user device 138 and/or the battery capacity and/or usage of battery 130 located in peripheral 100. In some non-limiting embodiments, controller 134 may determine a total available battery capacity by combining the battery capacity of the battery of user device 138 and the battery capacity of battery 130 located in peripheral 100. In some non-limiting embodiments, controller 134 may determine, by considering the usage of the battery of user device 138 and battery 130 located in the peripheral, a combined estimated run time for user device 138 and peripheral 100. In some non-limiting embodiments, data associated with the combined estimated run time may be displayed on the outward facing display of partner window 136. In some non-limiting embodiments, the usage information may include a plurality of time estimates. For example, the usage information may include a first time estimate estimating a time eye tracking device 114 will be used, a second time estimate estimating a time speaker 128 will be used, a third time estimate estimating a time partner window 136 will be used, and/or a fourth time estimate estimating a time user device 138 will be used. The plurality of time estimates may include assumptions regarding the amount of battery capacity used for each unit of time used. In some non-limiting embodiments, a combined estimate of available run time for peripheral 100 and user device 138 may be generated based on the combined plurality of time estimates and/or the total available battery capacity.

Although the eye tracking device of the depicted embodiment utilizes illuminators and an image sensor in order to provide eye tracking functionality, other types of eye tracking device may also be used. For example, in other embodiments the eye tracking device may utilize an image sensor and machine learning in order to determine the gaze of the user and output gaze information to the user device without requiring specific illumination. Other such eye tracking devices will be known to the skilled person and may be utilized with peripheral 100.

Although embodiments have been described in detail for the purpose of illustration, it is to be understood that such detail is solely for that purpose and that the disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. An eye tracking system comprising:
a peripheral, the peripheral comprising:
a housing configured to receive a user device in a position to present a display of the user device to a user, wherein the housing is configured to connect to the user device;
an eye tracking device configured to track a gaze of the user by capturing gaze data from the user;
a memory; and
at least one controller configured to:
receive the gaze data from the eye tracking device;
generate a user calibration profile of the user for the user device by mapping the gaze data to data associated with an image displayed via a display of the user device during an initial connection between the housing and the user device;
store the user calibration profile of the user for the user device in the memory of the peripheral; and
access the user calibration profile of the user for the user device when the peripheral connects to the user device during a subsequent connection between the housing and the user device.

2. The eye tracking system of claim 1, wherein the housing comprises an adjustable portion of a first size, and wherein the adjustable portion of the housing is configured to adjust from the first size to a second size to receive the user device.

3. The eye tracking system of claim 2, wherein the adjustable portion comprises a retractable member, and wherein the retractable member is configured to move in a vertical direction to secure the user device.

4. The eye tracking system of claim 1, wherein the eye tracking device comprises at least one image sensor and at least one illuminator.

5. The eye tracking system of claim 1, wherein the peripheral further comprises a protective case configured to at least partially surround the user device.

6. An eye tracking system for use with a user device, the eye tracking system comprising:
a peripheral, the peripheral comprising:
a first battery, wherein the first battery is connected to an external power source;
a housing configured to receive the user device in a position to present a display of the user device to a user, wherein the user device comprises a second battery, wherein the first battery is separate from the second battery;
an eye tracking device configured to track a gaze of the user; and
at least one controller configured to:
monitor a first charge status of the first battery of the peripheral;
monitor a second charge status of the second battery of the user device; and
select a charging scheme based on the first charge status, the second charge status, and the presence of the external power source.

7. The eye tracking system of claim 6, wherein the housing comprises an adjustable portion of a first size, and wherein the adjustable portion of the housing is configured to adjust from the first size to a second size to receive the user device.

8. The eye tracking system of claim 7, wherein the adjustable portion includes a retractable member, and wherein the retractable member is configured to move in a vertical direction to secure the user device.

9. The eye tracking system of claim 6, wherein the eye tracking device comprises at least one image sensor and at least one illuminator.

10. The eye tracking system of claim 6, wherein the peripheral further comprises a protective case configured to at least partially surround the user device.

11. A method comprising:
connecting a user device to an eye tracking system during a first connection;
receiving gaze data from a user of the user device;
generating a calibration profile of the user for the user device based on the gaze data, wherein the calibration profile enables the gaze data to be mapped to data associated with an image displayed via a display of the user device;
storing the calibration profile of the user for the user device in a memory of the eye tracking system; and
accessing the user calibration profile of the user for the user device when the eye tracking system connects to the user device during a subsequent connection.

12. The method of claim 11, wherein the user device comprises a housing, wherein the housing comprises an adjustable portion, and wherein the housing of the user device is configured to receive the user device in a position to present the display of the user device to the user, and wherein the method further comprises:
adjusting the adjustable portion of the housing from a first size to a second size, wherein the second size is based on a size of the user device.

13. The method of claim 12, wherein the adjustable portion includes a retractable member, and wherein the retractable member moves in a vertical direction to secure the user device.

14. The method of claim 11, wherein the eye tracking device comprises at least one image sensor and at least one illuminator.

15. The method of claim 11, wherein the user device comprises a protective case, and wherein the protective case is configured to at least partially surround the user device.

16. A method comprising:
receiving, by a housing of a peripheral, a user device in a position to present a display of the user device to a user, wherein the peripheral comprises a first battery connected to an external power source, wherein the user device comprises a second battery, and wherein the first battery is separate from the second battery;
tracking, by an eye tracking device of the peripheral, a gaze of the user;
monitoring, by a controller of the peripheral, a first charge status of the first battery of the peripheral;
monitoring, by the controller of the peripheral, a second charge status of the second battery of the user device; and
selecting, by the controller, a charging scheme based on the first charge status, the second charge status, and the presence of the external power source.

17. The method of claim 16, wherein receiving the user device further comprises:
adjusting, by the user, an adjustable portion of the housing configured to receive different sizes of the user device, wherein the adjustable portion includes a retractable member that moves vertically to secure a received user device.

18. The method of claim 16, wherein the eye tracking device comprises at least one image sensor and at least one illuminator.

* * * * *